(12) United States Patent
Chun et al.

(10) Patent No.: US 8,365,033 B2
(45) Date of Patent: Jan. 29, 2013

(54) METHOD OF TRANSMITTING ACK/NACK SIGNAL IN WIRELESS COMMUNICATION SYSTEM

(75) Inventors: Jin Young Chun, Anyang-si (KR); Dong Guk Lim, Anyang-si (KR); Sung Ho Park, Anyang-si (KR); Ja Ho Koo, Anyang-si (KR); Bin Chul Ihm, Anyang-si (KR); Wook Bong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 1038 days.

(21) Appl. No.: 12/361,294

(22) Filed: Jan. 28, 2009

(65) Prior Publication Data
US 2009/0199063 A1 Aug. 6, 2009

Related U.S. Application Data
(60) Provisional application No. 61/024,195, filed on Jan. 28, 2008.

(30) Foreign Application Priority Data
Jun. 18, 2008 (KR) .................. 10-2008-0057272

(51) Int. Cl.
*H04L 1/18* (2006.01)
(52) U.S. Cl. ...................................... 714/749
(58) Field of Classification Search ............ 714/749
See application file for complete search history.

(56) References Cited

U.S. PATENT DOCUMENTS

| | | | |
|---|---|---|---|
| 6,977,888 B1 | 12/2005 | Frenger et al. | |
| 7,995,615 B2 * | 8/2011 | Yang et al. | 370/479 |
| 8,103,929 B2 * | 1/2012 | Kwon et al. | 714/749 |
| 2005/0238053 A1 | 10/2005 | Iochi et al. | |
| 2005/0286408 A1 * | 12/2005 | Jin et al. | 370/208 |
| 2007/0097927 A1 * | 5/2007 | Gorokhov et al. | 370/335 |
| 2007/0211616 A1 | 9/2007 | Khandekar et al. | |
| 2007/0255993 A1 | 11/2007 | Yap et al. | |
| 2007/0286226 A1 * | 12/2007 | Yoon et al. | 370/445 |
| 2008/0137605 A1 * | 6/2008 | Berg | 370/330 |
| 2008/0227481 A1 * | 9/2008 | Naguib et al. | 455/550.1 |

FOREIGN PATENT DOCUMENTS

| | | |
|---|---|---|
| KR | 10-2006-0016723 A | 2/2006 |
| KR | 10-2007-0080191 A | 8/2007 |
| WO | WO 2007/051158 A2 | 5/2007 |

OTHER PUBLICATIONS

"IEEE Standard for Local and Metropolitan Area Networks Part 16: Air Interface for Fixed Broadband Wireless Access Systems; IEEE Std 802.16-2004 (Revision of IEEE Std 802.16.2001)", IEEE Standard [IEEE Stanard], IEEE, Jan. 1, 2004, pp. 1-895, XP017603700.

* cited by examiner

*Primary Examiner* — Scott Baderman
*Assistant Examiner* — Neil Miles
(74) *Attorney, Agent, or Firm* — Birch, Stewart, Kolasch & Birch, LLP (57) ABSTRACT

A method of transmitting an acknowledgment (ACK)/non-acknowledgement (NACK) signal in a wireless communication system includes assigning at least one ACK channel among a plurality of ACK channels which share an ACK channel region for transmitting the ACK/NACK signal, and transmitting the ACK/NACK signal through the at least one ACK channel, wherein the ACK channel region includes at least one tile including a plurality of data subcarriers, and the ACK/NACK signal of each ACK channel is indicated by mapping different orthogonal vectors respectively to the plurality of ACK channels in the tile.

6 Claims, 9 Drawing Sheets

METHOD OF TRANSMITTING ACK/NACK SIGNAL IN WIRELESS COMMUNICATION SYSTEM

CROSS-REFERENCE TO RELATED APPLICATIONS

This application claims the benefit of priority of U.S. Provisional Application No. 61/024,195 filed on Jan. 28, 2008, and Korean Patent Application No. 10-2008-0057272 filed on Jun. 18, 2008 which are incorporated by reference in its entirety herein.

FIELD OF THE INVENTION

The present invention relates to wireless communications, and more particularly, to a method for transmitting a multiplexed acknowledgment (ACK)/non-acknowledgement (NACK) signal by assigning a plurality of ACK channels in one ACK channel region.

DESCRIPTION OF THE RELATED ART

The institute of electrical and electronics engineers (IEEE) 802.16 standard provides a technique and protocol for supporting broadband wireless access. The standardization had been conducted since 1999 until the IEEE 802.16-2001 was approved in 2001. The IEEE 802.16-2001 is based on a physical layer of a single carrier (SC) called 'WirelessMAN-SC'. The IEEE 802.16a standard was approved in 2003. In the IEEE 802.16a standard, 'WirelessMAN-OFDM' and 'WirelessMAN-OFDMA' are further added to the physical layer in addition to the 'WirelessMAN-SC'. After completion of the IEEE 802.16a standard, the revised IEEE 802.16-2004 standard was approved in 2004. To correct bugs and errors of the IEEE 802.16-2004 standard, the IEEE 802.16-2004/Cor1 was completed in 2005 in a format of 'corrigendum'.

An error correction scheme is used to secure communication reliability. Examples of the error correction scheme include a forward error correction (FEC) scheme and an automatic repeat request (ARQ) scheme. In the FEC scheme, errors in a receiving end are corrected by appending an extra error correction code to information bits. In the ARQ scheme, errors are corrected through data retransmission. Examples of the ARQ scheme include a stop and wait (SAW) scheme, a go-back-N (GBN) scheme, a selective repeat (SR) scheme, etc. The SAW scheme is a scheme in which a frame is transmitted after determining whether the transmitted frame is correctly received. The GBN scheme is a scheme in which N contiguous frames are transmitted, and if transmission is unsuccessful, all frames which are transmitted after an erroneous frame are retransmitted. The SR scheme is a scheme in which only the erroneous frame is selectively retransmitted.

The FEC scheme has an advantage in that a time delay is not significant and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment. To solve such disadvantages, a hybrid automatic repeat request (HARQ) scheme is proposed by combining the FEC scheme and the ARQ scheme. In the HARQ scheme, it is determined whether an unrecoverable error is included in data received by a physical, and retransmission is requested upon detecting the error, thereby improving performance.

In the HARQ scheme, if no error is detected from the received data, a receiver transmits an acknowledgement (ACK) signal as a response signal so that a transmitter is informed that the data is successfully received. Otherwise, if an error is detected from the received data, the receiver transmits a non-acknowledgement (NACK) signal as a response signal so that the transmitter is informed that the data is unsuccessfully received. When the NACK signal is received, the transmitter transmits retransmission data. The ACK/NACK signal is an important control signal for ensuring communication reliability and is frequently transmitted according to the number of data transmission attempts.

Accordingly, there is a need for a method capable of effectively transmitting an ACK/NACK signal frequently transmitted in a wireless communication system.

SUMMARY OF THE INVENTION

The present invention provides a method for transmitting an acknowledgment (ACK)/non-acknowledgement (NACK) signal in a wireless communication system.

In an aspect, a method of transmitting an ACK/NACK signal in a wireless communication system includes assigning at least one ACK channel among a plurality of ACK channels which share an ACK channel region for transmitting the ACK/NACK signal, and transmitting the ACK/NACK signal through the at least one ACK channel, wherein the ACK channel region includes at least one tile including a plurality of data subcarriers, and the ACK/NACK signal of each ACK channel is indicated by mapping different orthogonal vectors respectively to the plurality of ACK channels in the tile.

In another aspect, a method of transmitting an ACK/NACK signal in a wireless communication system includes receiving downlink data, and transmitting the ACK/NACK signal through an ACK channel in response to the downlink data, wherein the ACK/NACK signal is expressed with an orthogonal vector selected from a plurality of orthogonal vector sets respectively corresponding to a plurality of ACK channels iteratively assigned to one ACK channel region.

DETAILED DESCRIPTION OF THE INVENTION

Figure 1:
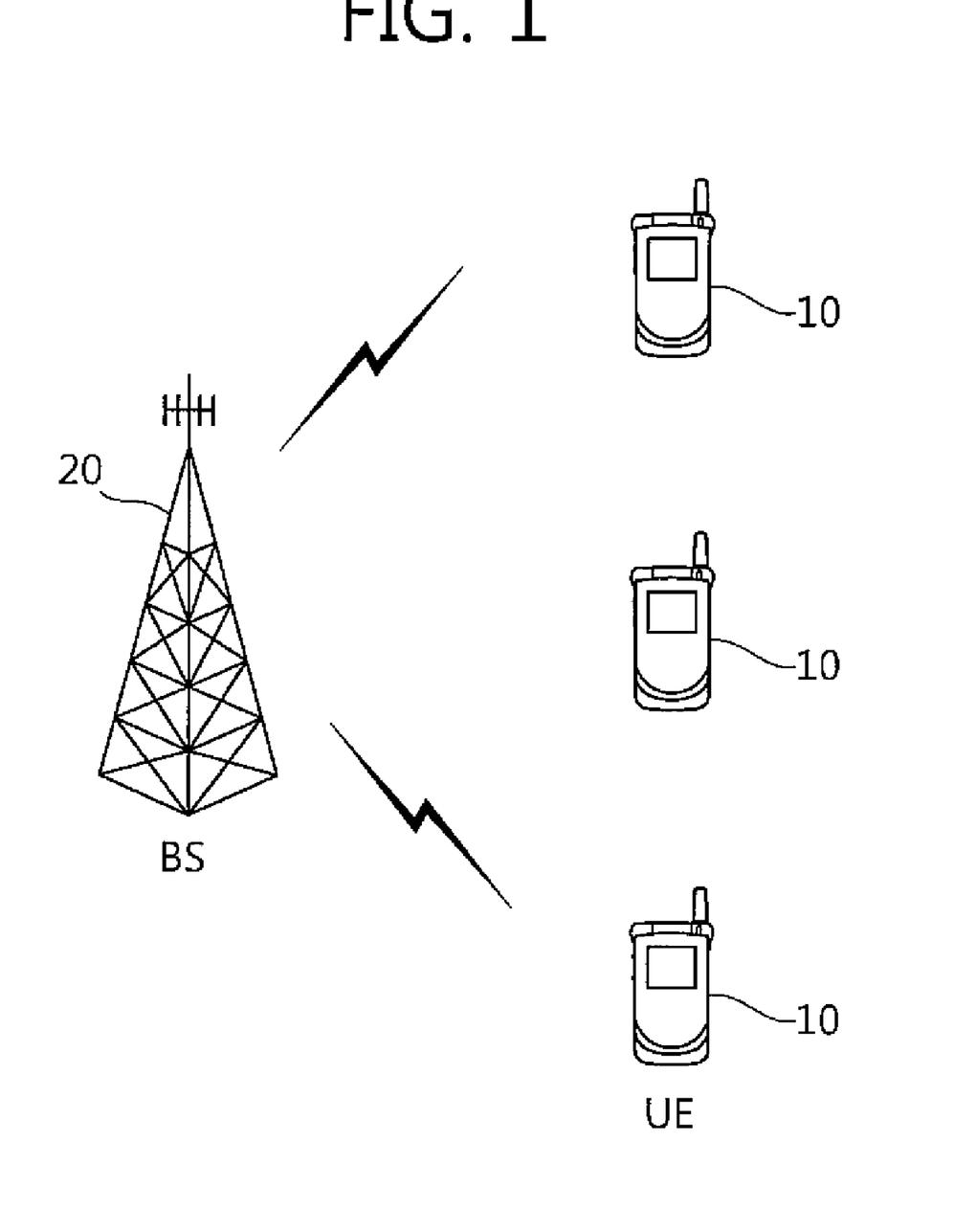
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

A downlink (DL) represents a communication link from the BS 20 to the UE 10, and an uplink (UL) represents a communication link from the UE 10 to the BS 20. In the DL, a transmitter may be a part of the BS 20, and a receiver may be a part of the UE 10. In the UL, the transmitter may be a part of the UE 10, and the receiver may be a part of the BS 20.

The wireless communication system may be an orthogonal frequency division multiplexing (OFDM)/orthogonal frequency division multiple access (OFDMA)-based system. The OFDM uses a plurality of orthogonal subcarriers. Further, the OFDM uses an orthogonality between inverse fast Fourier transform (IFFT) and fast Fourier transform (FFT). The transmitter transmits data by performing IFFT. The receiver restores original data by performing FFT on a received signal. The transmitter uses IFFT to combine the plurality of subcarriers, and the receiver uses FFT to split the plurality of subcarriers.

Figure 2:
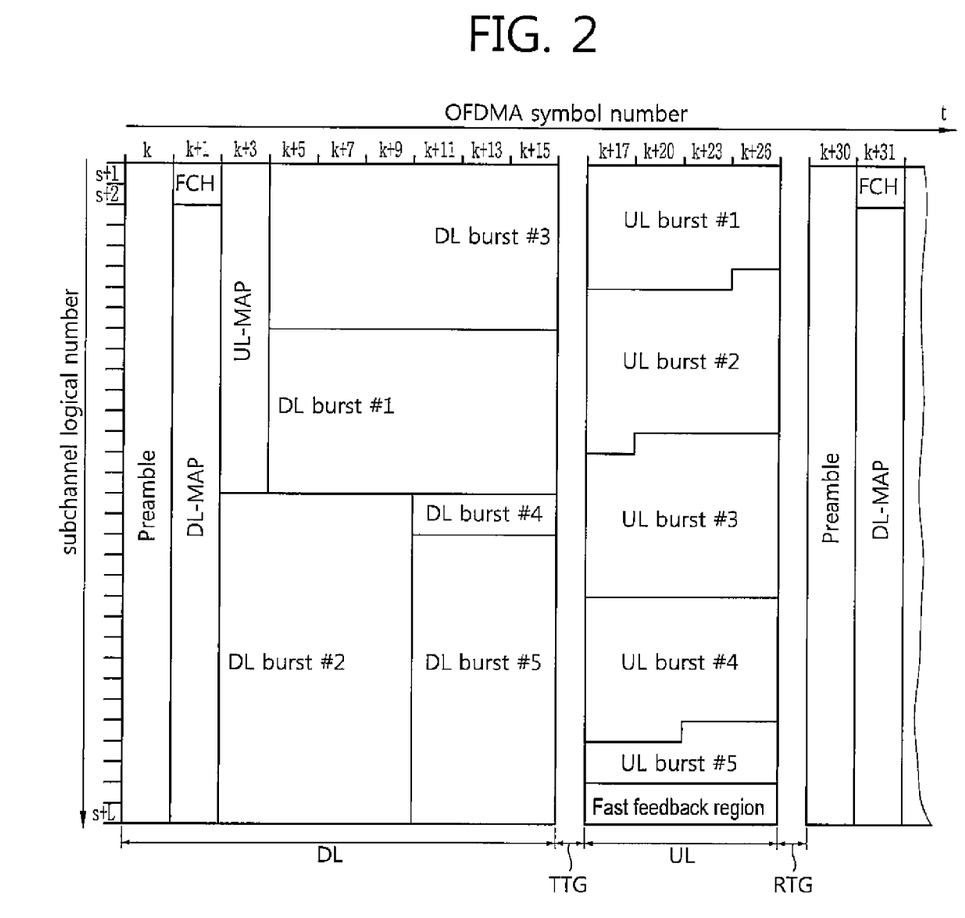
FIG. 2 shows an example of a frame structure.

FIG. 2 shows an example of a frame structure. A frame is a data sequence used according to a physical specification in a fixed time duration. This may be found in section 8.4.4.2 of the "Part 16: Air Interface for Fixed Broadband Wireless Access Systems" in the institute of electrical and electronics engineers (IEEE) standard 802.16-2004 (hereinafter, Document 1).

Referring to FIG. 2, the frame includes a downlink (DL) frame and an uplink (UL) frame. In a time division duplexing (TDD) scheme, UL and DL transmissions are achieved at different time points but share the same frequency band. The DL frame temporally precedes the UL frame. The DL frame sequentially includes a preamble, a frame control header (FCH), a DL-MAP, a UL-MAP, and a burst region. Guard times are provided to identify the UL frame and the DL frame and are inserted to a middle portion (between the DL frame and the UL frame) and a last portion (next to the UL frame) of the frame. A transmit/receive transition gap (TTG) is a gap between a downlink burst and a subsequent uplink burst. A receive/transmit transition gap (RTG) is a gap between an uplink burst and a subsequent downlink burst.

A preamble is used between a BS and a UE for initial synchronization, cell search, and frequency-offset and channel estimation. The FCH includes information on a length of a DL-MAP message and a coding scheme of the DL-MAP.

The DL-MAP is a region for transmitting the DL-MAP message. The DL-MAP message defines access to a downlink channel. The DL-MAP message includes a configuration change count of a downlink channel descriptor (DCD) and a BS identifier (TD). The DCD describes a downlink burst profile applied to a current MAP. The downlink burst profile indicates characteristics of a downlink physical channel. The DCD is periodically transmitted by the BS by using a DCD message.

The UL-MAP is a region for transmitting a UL-MAP message. The UL-MAP message defines access to an uplink channel. The UL-MAP message includes a configuration change count of an uplink channel descriptor (UCD) and also includes an effective start time of uplink allocation defined by the UL-MAP. The UCD describes an uplink burst profile. The uplink burst profile indicates characteristics of an uplink physical channel and is periodically transmitted by the BS by using a UCD message.

A fast-feedback region is included in a portion of the UL frame. The fast-feedback region is a region which is assigned for faster uplink transmission than general uplink data. Channel quality information (CQI) or acknowledgement (ACK)/non-acknowledgement (NACK) signals can be carried on the fast-feedback region. The fast-feedback region may be located in any position in the UL frame, and the position or size of the fast-feedback region is not limited as shown in FIG. 2.

Hereinafter, a slot is a minimum unit of possible data allocation, and is defined with a time and a subchannel. The number of subchannels depends on an FFT size and time-frequency mapping. Each subchannel includes a plurality of subcarriers. The number of subcarriers included in each subchannel differs according to a permutation rule. Permutation denotes mapping from a logical subchannel to a physical subcarrier. In full usage of subchannels (FUSC), each subchannel includes 48 subcarriers. In partial usage of subchannels (PUSC), each subchannel includes 24 or 16 subcarriers. A segment denotes at least one subchannel set.

In order for data to be mapped to physical subcarriers in a physical layer, two steps are generally performed on the data. In a first step, the data is mapped to at least one data slot on at least one logical subchannel. In a second step, each logical subchannel is mapped to a physical subcarrier. This is called permutation. Examples of the permutation rule employed in the Document 1 above include FUSC, PUSC, optional-FUSC (O-FUSC), optional-PUSC (O-PUSC), adaptive modulation and coding (AMC), etc. A set of OFDM symbols using the same permutation rule is referred to as a permutation zone. One frame includes at least one permutation zone.

The FUSC and the O-FUSC are used only in downlink transmission. The FUSC consists of one segment including all subchannel groups. Each subchannel is mapped to a physical subcarrier distributed over the entire physical channel. This mapping varies for each OFDM symbol. A slot consists of one subchannel on one OFDM symbol. The O-FUSC uses a pilot allocation scheme different from that used in the FUSC.

The PUSC is used both in downlink transmission and uplink transmission. In downlink, each physical channel is divided into clusters, each of which includes 14 contiguous subcarriers on two OFDM symbols. The physical channel is mapped to six groups. In each group, pilots are allocated in fixed positions to each cluster. In uplink, subcarriers are divided into tiles, each of which includes four contiguous physical subcarriers on three OFDM symbols. The subchannel includes six tiles. Pilots are allocated to the corners of each tile. The O-PUSC is used only in uplink transmission. Each tile includes three contiguous physical subcarriers on three OFDM symbols. Pilots are allocated to the center of each tile.

Figure 3:
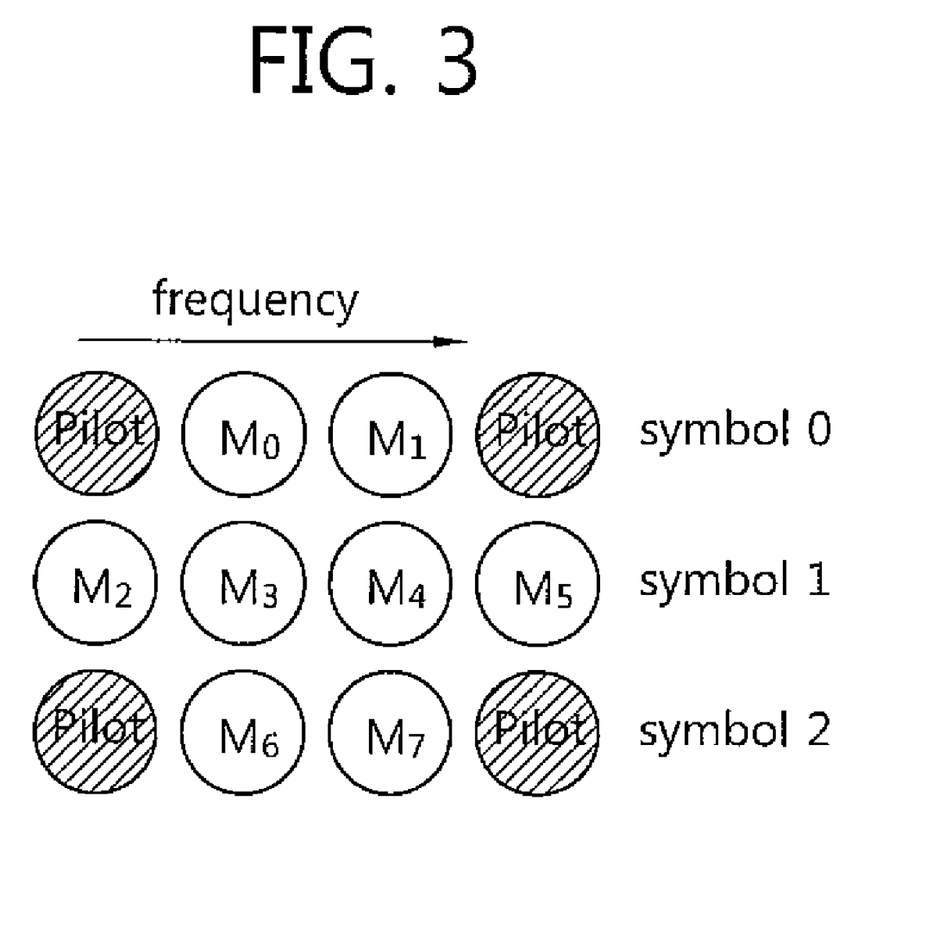
FIG. 3 shows an example of a tile.

FIG. 3 shows an example of a tile. The tile is a PUSC tile.

Referring to FIG. 3, one tile consists of 4 subcarriers in a frequency domain and 3 OFDM symbols in a time domain, that is, 12 subcarriers in total. The 12 subcarriers can be divided into 8 data subcarriers $M_0$ to $M_7$ and 4 pilot subcarriers. A data symbol is carried on the data subcarrier. The data symbol may be a symbol for user data or a control signal. A pilot or 'Null' can be carried on the pilot subcarrier. To utilize the pilot subcarrier, other data symbols may be carried and transmitted on the pilot subcarrier. In uplink, a subchannel of the PUSC permutation rule includes 48 data subcarriers and 24 pilot subcarriers.

Figure 4:
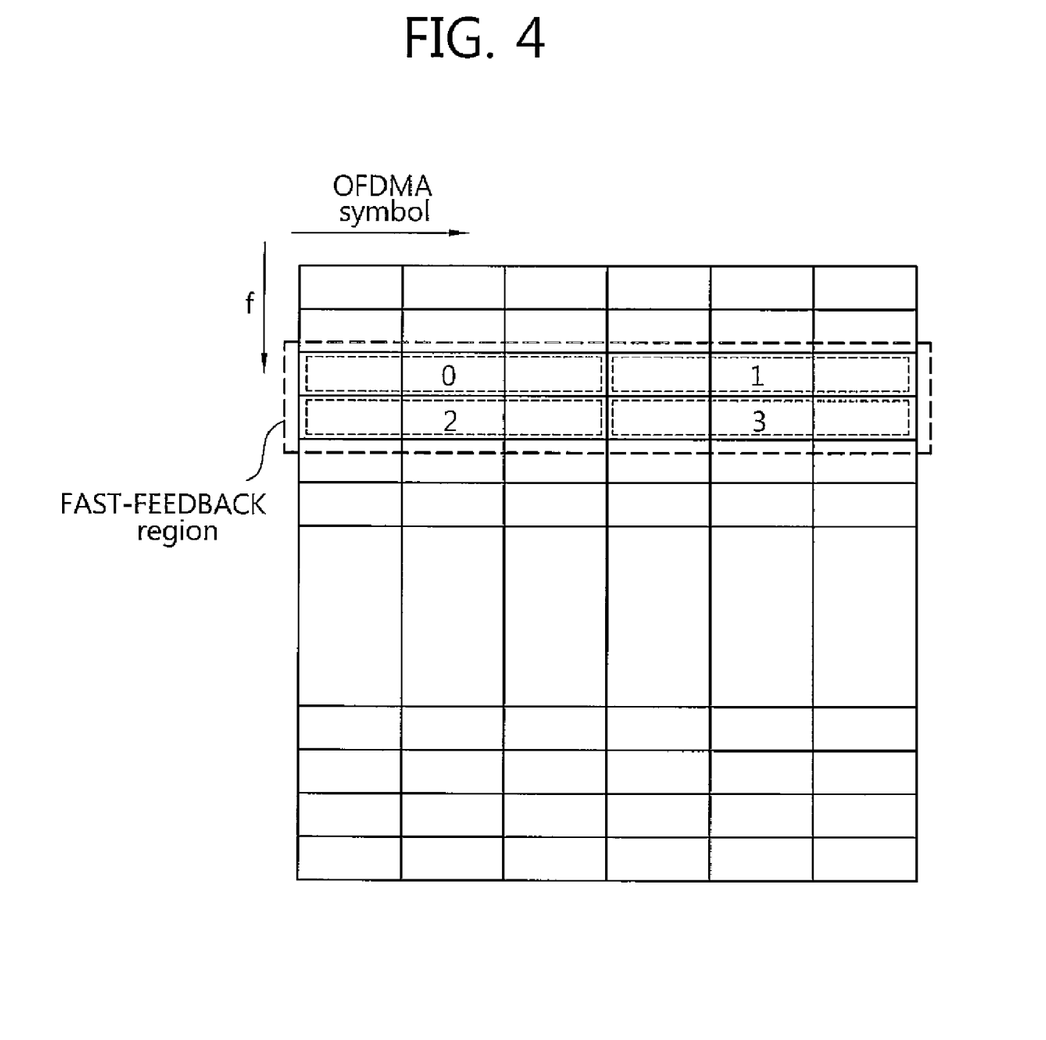
FIG. 4 shows an example of a fast-feedback region.

FIG. 4 shows an example of a fast-feedback region.

Referring to FIG. 4, a fast-feedback message is mapped to the fast-feedback region. One fast-feedback message can occupy one fast-feedback slot. Herein, it is shown that four fast-feedback slots each having a size of 3 OFDM symbols are assigned to one fast-feedback region. The fast-feedback slot may correspond to one subchannel.

One subchannel may include a plurality of tiles. For clarity of explanation, it is assumed that one subchannel includes 6 tiles. In the PUSC permutation rule, one subchannel includes 48 data subcarriers and 24 pilot subcarriers. In the O-PUSC permutation rule, one subchannel includes 48 data subcarriers and 6 pilot subcarriers. Six tiles can be distributively located throughout the entire band.

The fast-feedback region can be assigned to an ACK channel. The ACK channel is a channel for transmitting an ACK/NACK signal. A ½ subchannel (i.e., 3 tiles) can be assigned to the ACK channel. The ACK channel can use the PUSC or the O-PUSC permutation rule.

The ACK/NACK signal can be mapped to a data subcarrier of each tile. Table 1 below shows modulation symbols carried on the 8 data subcarriers included in one tile. One modulation symbol is carried on one data subcarrier, and 8 modulation symbols carried on one tile constitute one vector. 8 types of vector can be formed in total, and their indices have values in the range of 0 to 7.

TABLE 1

| Vector index | $M_{n,m8}, M_{n,8m+1}, \ldots M_{n,8m+7}$ |
| --- | --- |
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P3, P0, P2, P2, P0, P2, P0 |
| 7 | P0, P2, P2, P0, P2, P0, P0, P2 |

Symbols constituting each vector can be expressed by Equation 1 below. P(0), P(1), P(2), and P(3) denote phases of symbols on a constellation map. This can be used in a quadrature phase shift keying (QPSK) modulation scheme.

$$P0 = \exp\left(j \cdot \frac{\pi}{4}\right)$$
$$P1 = \exp\left(j \cdot \frac{3\pi}{4}\right)$$
$$P2 = \exp\left(-j \cdot \frac{3\pi}{4}\right)$$
$$P3 = \exp\left(-j \cdot \frac{\pi}{4}\right)$$

[Equation 1]

Herein, vectors having different indices are orthogonal to one another.

If 1-bit payload represents the ACK/NACK signal (e.g., if 0, the ACK/NACK signal is ACK and if 1, the ACK/NACK signal is NACK), a vector assigned to the ACK channel can be expressed by Table 2 below.

TABLE 2

| ACK 1-bit symbol | Vector indices per Tile Tile(0), Tile(1), Tile(2) |
| --- | --- |
| 0 | 0, 0, 0 |
| 1 | 4, 7, 2 |

A ½ subchannel is assigned for the ACK channel, and thus three tiles are assigned to one ACK channel. Since one vector is assigned to one tile, three vectors are required to express the ACK/NACK signal. An ACK/NACK signal mapped to the ACK channel and expressed in a vector format is referred to as a codeword of the ACK/NACK signal.

Mapping of the ACK/NACK signal on the ACK channel may be found in sector 8.4.5.4.13 of the IEEE standard 802.16-2004 "Part 16: Air Interface for Fixed Broadband Wireless Access Systems".

Meanwhile, a transmitter that performs HARQ can transmit m transmission blocks through one frame by performing a plurality of HARQ processes in a parallel manner, and a receiver can transmit m ACK/NACK signals in response to the m transmission blocks (where m is integer greater than 1). In addition, a BS that transmits data for a plurality of users receives a plurality of ACK/NACK signals from the plurality of users. When one ACK channel (i.e., ½ subchannel) is assigned for one ACK/NACK signal in a system in which a plurality of ACK/NACK signals are transmitted according to the HARQ, limited radio resources can be wasted. For example, if the BS transmits 10 transmission blocks to one user, the BS has to assign 5 subchannels to one user to receive the ACK/NACK signals. Alternatively, if the BS transmits one transmission block to each of 10 users, the BS also has to assign 5 subchannels to receive the ACK/NACK signals from the 10 users. The number of ACK/NACK signals is increased in proportion to the number of pieces of data to be transmitted. Accordingly, an amount of radio resources used for the ACK/NACK signals is also increased. Due to limited radio resources, there is a limit in allocation of radio resources that can be allocated for the ACK/NACK signals.

A method capable of transmitting a plurality of ACK/NACK signals in a more effective manner is necessary. For this, instead of assigning one ACK channel to one ACK/NACK signal, the BS assigns one ACK channel to the plurality of ACK/NACK signals. The plurality of ACK/NACK signals may be ACK/NACK signals of multiple users or ACK/NACK signals of a single user. That is, the BS may assign one ACK channel to the multiple users so that the ACK/NACK signals of the multiple users are multiplexed to one ACK channel, or may assign one ACK channel to the single user so that the single user can perform transmission by multiplexing the plurality of ACK/NACK signals to one ACK channel.

Hereinafter, a method capable of multiplexing and transmitting a plurality of ACK/NACK signals will be described.

<Multiplexing of ACK/NACK Signal by Using Pilot>

A plurality of ACK channels are assigned to an ACK channel region for transmitting an ACK/NACK signal and thus a multiplexed ACK/NACK signal is transmitted. That is, a plurality of ACK channels share one ACK channel region. It is assumed hereinafter that one ACK channel uses a ½ subchannel (i.e., 3 tiles) of the PUSC permutation rule. This is for exemplary purposes only, and thus the number of tiles and the permutation rule used in the ACK channel are not limited thereto.

Figure 5:
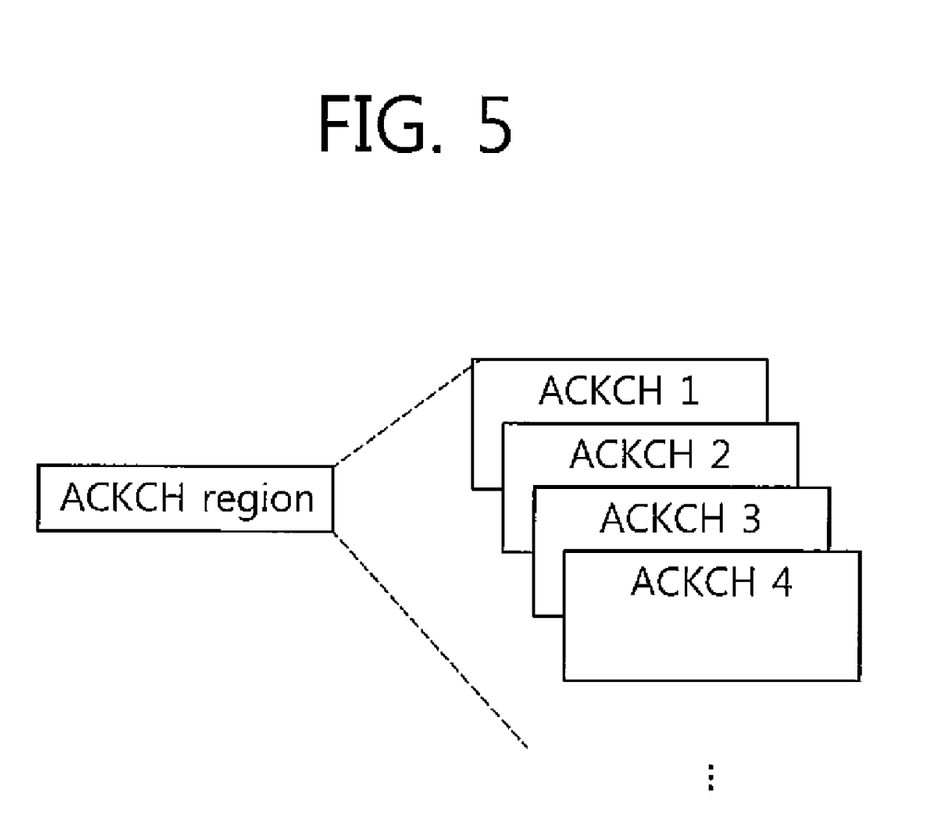
FIG. 5 shows assignment of a plurality of acknowledgment (ACK) channels in an ACK channel region according to an embodiment of the present invention.

FIG. 5 shows assignment of a plurality of ACK channels in an ACK channel region according to an embodiment of the present invention.

Referring to FIG. 5, an ACK channel (ACKCH) region is a region where an ACKCH for transmitting an ACK/NACK signal is assigned in a frame. The ACKCH region may be a fast-feedback region. A ½ slot of the fast-feedback region can be assigned to the ACKCH region. That is, a ½ subchannel can be assigned to the ACKCH region. Although one ACKCH region is shown herein, a plurality of ACKCH regions can be assigned in the frame.

The ACK/NACK signal is multiplexed by assigning a plurality of ACKCHs to one ACKCH region. Since the ACKCH uses the ½ subchannel of the PUSC permutation rule, 3 tiles are assigned to one ACKCH. Each channel includes 8 data subcarriers and 4 pilot subcarriers. The ACKCHs assigned to one ACKCH region can be iteratively assigned by the number of pilot subcarriers of a tile. That is, if a channel is estimated using a pilot, ACKCHs can be iteratively assigned by the number of pilots.

Since one tile includes 4 pilots, 4 ACKCHs can be multiplexed in one ACKCH region. The BS can assign a specific number of ACKCHs to one ACKCH region, where the specific number corresponds to the number of pilot subcarriers. The BS can assign 4 ACKCHs to the ACKCH region that uses the PUSC permutation rule. The ACKCH multiplexed in one ACKCH region can be assigned to one UE or a plurality of UEs.

A plurality of ACK/NACK signals are multiplexed to a plurality of ACKCHs assigned to one ACKCH region by using an orthogonal vector set. Table 3 below shows an example of vector sets assigned to the ACKCHs.

TABLE 3

| ACK Channel | ACK/NACK signal | vector indices per tile (Orthogonal Vector sets) |
|---|---|---|
| ACKCH 1 | ACK | 0, 0, 0 |
|  | NACK | 4, 7, 2 |
| ACKCH 2 | ACK | 1, 1, 1 |
|  | NACK | 2, 2, 7 |
| ACKCH 3 | ACK | 3, 3, 3 |
|  | NACK | 5, 5, 5 |
| ACKCH 4 | ACK | 6, 6, 6 |
|  | NACK | 7, 4, 4 |

In Table 3, a vector index indicates a vector consisting of 8 modulation symbols. As a vector used for each ACKCH, 8 vectors consisting of 8 modulation symbols can be used as shown in Table 1. 3 vectors may constitute one vector set, and may constitute 8 types of mutually orthogonal vector sets. Since the 8 types of vector sets used in each ACKCH are orthogonal, interference does not occur between the vector sets. Therefore, the ACK/NACK signal can be multiplexed to 4 ACKCHs by the using mutually orthogonal vector sets.

If a plurality of ACKCHs are assigned to one ACKCH region, a pilot may be used to identify each ACKCH. That is, a plurality of ACK/NACK signals transmitted through one ACKCH region can be identified by using a pilot. A method for identifying a multiplexed ACK/NACK signal by using the pilot includes a pilot separation method and an orthogonal pilot allocation method.

First, the pilot separation method will be described.

Figure 6:
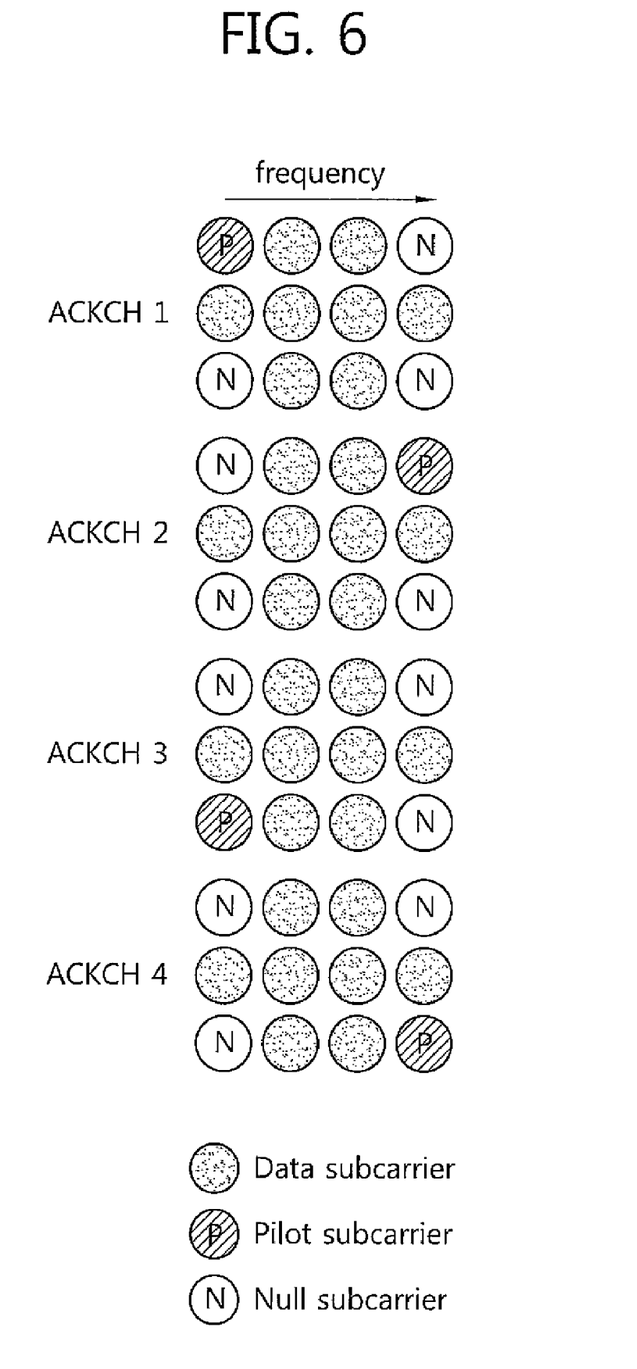
FIG. 6 shows a pilot allocation method in an ACK channel to be multiplexed according to an embodiment of the present invention.

FIG. 6 shows a pilot allocation method in an ACKCH to be multiplexed according to an embodiment of the present invention. 4 ACKCHs 1, 2, 3, and 4 are assigned to one ACKCH region, and only one tile of each ACKCH is shown herein.

Referring to FIG. 6, the pilot separation method is a method in which pilots of a tile are used by dividing the pilots by the number of ACKCHs assigned to one ACKCH region. If 4 ACKCHs are assigned to one ACKCH region, any one of 4 pilot subcarriers of the tile is used in each ACKCH. That is, one ACKCH performs transmission by carrying a pilot P on only any one of the 4 pilot subcarriers, and transmits null subcarriers by carrying NULL (N) on the remaining pilot subcarriers. In this case, a pilot of each ACKCH is assigned to a pilot subcarrier located at a position where the ACKCHs do not overlap with each another.

The position of the pilot subcarrier used for pilot transmission can be predetermined for each ACKCH. The BS can report the position of the pilot subcarrier, on which a pilot is transmitted, to the UE for each ACKCH while assigning a plurality of ACKCHs to one ACKCH region. The BS can estimate a channel state of the plurality of ACKCHs by using a pilot carried on each pilot subcarrier. Since 4 pilots are used, the channel state can be estimated for 4 ACKCHs. A multiplexed ACK/NACK signal transmitted by being carried on a data subcarrier can be decoded by considering the estimated channel state.

Although it has been described herein that 4 ACKCHs are assigned to one ACKCH region, the number of ACKCHs that can be iteratively assigned to one ACKCH region can be variously determined to be a value less than or equal to the number of pilot subcarriers of a tile, and there is no restriction on the position and number of pilot subcarriers used for pilot transmission in each ACKCH.

Now, the orthogonal pilot allocation method will be described.

Figure 7:
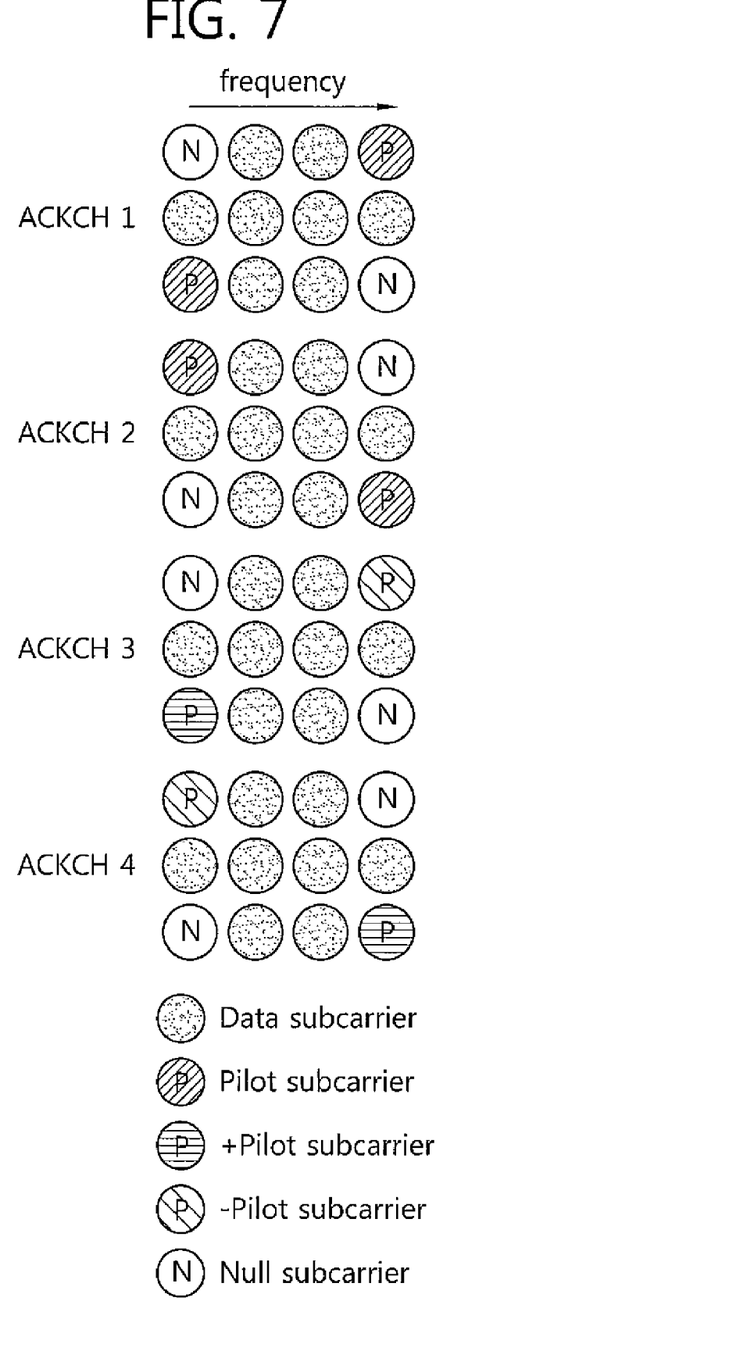
FIG. 7 shows a pilot allocation method in an ACK channel to be multiplexed according to another embodiment of the present invention.

FIG. 7 shows a pilot allocation method in an ACKCH to be multiplexed according to another embodiment of the present invention. 4 ACKCHs 1, 2, 3, and 4 are assigned to one ACKCH region, and only one tile of each ACKCH is shown herein.

Referring to FIG. 7, the orthogonal pilot allocation method is a method in which pilots having different patterns are assigned to each ACKCH so that the pilots do not interfere with one another among a plurality of ACKCHs assigned to one ACKCH region. If 4 ACKCHs are assigned to one ACKCH region, 4 pilot patterns are used. A first ACKCH carries and transmits pilots only on two pilot subcarriers among 4 pilot subcarriers, and transmits null subcarriers by carrying NULL (N) on the remaining two pilot subcarriers. A second ACKCH carries and transmits pilots on two pilot subcarriers located at a position where the second ACKCH does not overlap with the first ACKCH, and transmits the remaining two pilots as null subcarriers. A third ACKCH carries and transmits a pilot whose phase is shifted to (+) on one pilot subcarrier among the 4 pilot subcarriers, carries and transmits a pilot whose phase is shifted to (−) on another pilot subcarrier, and transmits null subcarriers by carrying NULL on the remaining two pilot subcarriers. Herein, (+) and (−) denote phase modulation of a symbol on a constellation map. A pilot phase may be modulated to identify two types of signals according to a binary phase shift keying (BPSK) scheme. A fourth ACKCH carries a pilot whose phase is shifted to (+) on one pilot subcarrier between two pilot subcarriers used as null subcarriers in the third ACKCH, carries and transmits a pilot whose phase is shifted to (−) on the other pilot subcarrier, and transmits the remaining two pilot subcarriers as null subcarriers.

A phase modulation value and a position of a pilot subcarrier used for pilot transmission can be predetermined for each ACKCH. The BS can report a pilot pattern of the ACKCH to the UE while assigning a plurality of ACKCHs to one ACKCH region. The BS can estimate a channel state according to the pilot pattern of each ACKCH, and can decode a multiplexed ACK/NACK signal carried and transmitted on a data subcarrier by considering the estimated channel state.

The number of ACKCHs that can be iteratively assigned to one ACKCH region can be determined variously according to the pilot pattern, and an orthogonal pilot pattern can be configured variously.

<Multiplexing of ACK/NACK Signal by Not Using Pilot>

A plurality of ACKCHs are assigned to an ACKCH region for transmitting an ACK/NACK signal and thus a multiplexed ACK/NACK signal is transmitted. In this case, a tile used by the ACKCH does not include a pilot subcarrier, and all subcarriers are used as data subcarriers.

Figure 8:
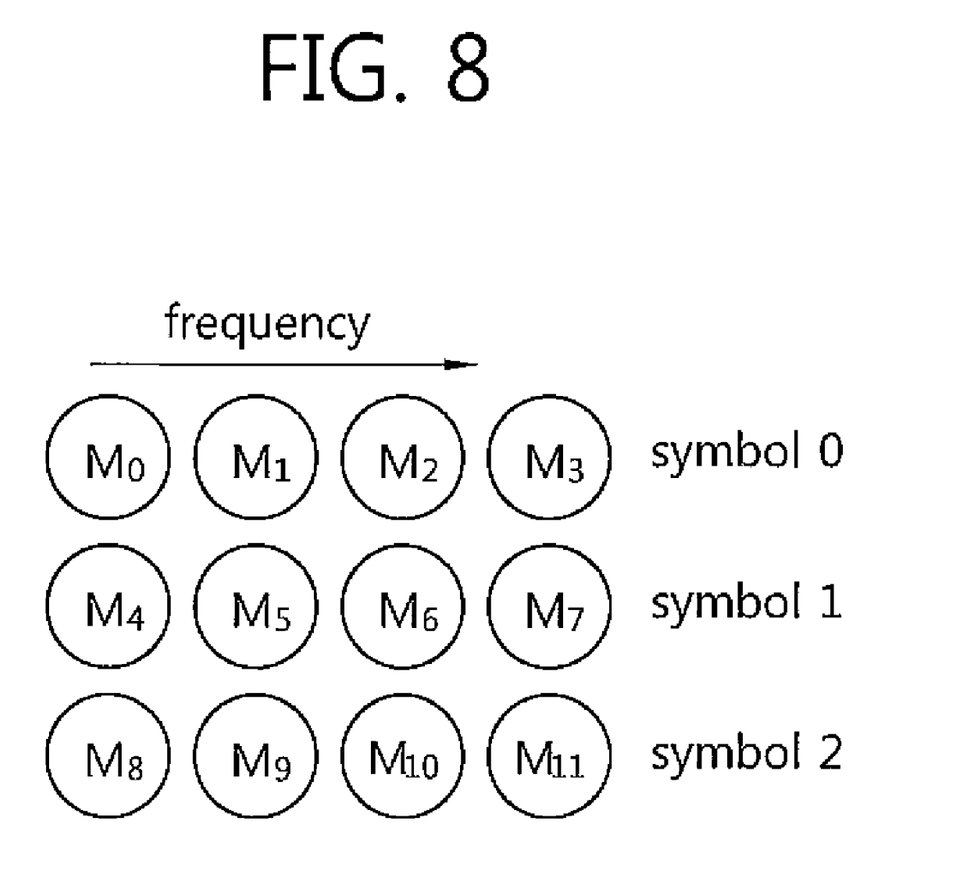
FIG. 8 shows a tile structure according to an embodiment of the present invention.

FIG. 8 shows a tile structure according to an embodiment of the present invention.

Referring to FIG. 8, an orthogonal code is used as an ACK/NACK signal. If the orthogonal code is used as the ACK/NACK signal, a plurality of ACK/NACK signals can be decoded without having to estimate a channel state by using a pilot.

Assume that 3 tiles are used in an ACKCH region, and each tile consists of 4 subcarriers on 3 OFDM symbols in a frequency domain. Instead of assigning a pilot subcarrier to each tile, all of 12 subcarriers are assigned to data subcarriers $M_0$, $M_1$, ..., and $M_{11}$. An orthogonal code having a length of 12 is mapped to each tile. 3 orthogonal codes mapped to 3 tiles represent one ACK/NACK signal. Examples of the orthogonal code may include a Hadamard code, a discrete Fourier transform (DFT) sequence, a Walsh code, a constant amplitude zero auto-correlation (CAZAC) sequence, etc.

Equation 2 shows an example of a DFT matrix.

$$\begin{bmatrix} W_1 \\ W_2 \\ \vdots \\ W_N \end{bmatrix} = \begin{bmatrix} 1 & 1 & 1 & \ldots & 1 \\ 1 & w & w^2 & \ldots & w^{N-1} \\ \vdots & \vdots & \vdots & & \vdots \\ 1 & w^{N-1} & w^{2(N-1)} & \ldots & w^{(N-1)(N-1)} \end{bmatrix} \text{ where,}$$ [Equation 2]

$$w = e^{-j2\pi/N}$$

If N=12, 12 DFT sequences having a length of 12 can be generated. The 12 DFT sequences can be expressed by Equation 3 below.

$$W_n = [w^{0 \cdot (n-1)} w^{1 \cdot (n-1)} \ldots w^{11 \cdot (n-1)}]$$ [Equation 3]

Herein, an index n of a DFT sequence has a value in the range of 1 to 12. A vector set that represents an ACK/NACK signal can be configured by using a DFT sequence having a length of 12. Table 4 shows an example of a vector set using the DFT sequence.

TABLE 4

| ACK Channel | ACK/NACK signal | orthogonal code per tile (Orthogonal code Vector sets) |
|---|---|---|
| ACKCH 1 | ACK | $W_1, W_1, W_1$ |
|  | NACK | $W_2, W_2, W_2$ |
| ACKCH 2 | ACK | $W_3, W_3, W_3$ |
|  | NACK | $W_4, W_4, W_4$ |
| ACKCH 3 | ACK | $W_5, W_5, W_5$ |
|  | NACK | $W_6, W_6, W_6$ |
| ACKCH 4 | ACK | $W_7, W_7, W_7$ |
|  | NACK | $W_8, W_8, W_8$ |
| ACKCH 5 | ACK | $W_9, W_9, W_9$ |
|  | NACK | $W_{10}, W_{10}, W_{10}$ |
| ACKCH 6 | ACK | $W_{11}, W_{11}, W_{11}$ |
|  | NACK | $W_{12}, W_{12}, W_{12}$ |

As disclosed in Table 4, an ACK signal of ACKCH 1 is indicated by repeated tiles, each of which comprises the same orthogonal code W1. Accordingly, an ACKCH may be indicated by mapping the same orthogonal code (e.g., W1) to each of the repeated tiles (e.g., each of 3 tiles). When the vector set is configured using 12 DFT sequences, 6 ACKCHs can be assigned to one ACKCH region. The 12 DFT sequences represent respective ACK/NACK signals of 6 ACKCHs. 3 DFT sequences are respectively assigned to 3 tiles of the ACKCH.

Although the DFT sequence is used herein as an example, the vector representing the ACK/NACK signal of each ACKCH can be configured using various orthogonal codes such as the Hadamard code, the Walsh code, the CAZAC sequence, etc. The ACKCH dose not have to use 3 tiles always, and one ACK/NACK signal can be expressed by assigning one orthogonal code to one tile. In addition, when the ACKCH uses a tile of the O-PUSC permutation rule, 9 vector sets can be configured using an orthogonal code having a length of 9 so that mapping can be achieved to 9 subcarriers included in the tile. 5 ACKCHs can be assigned to one ACKCH region by using the 9 vector sets. The ACK/NACK signal can be expressed with a vector set in 4 ACKCHs, and only one ACK signal can be expressed as a vector set in a $5^{th}$ ACKCH, When the ACKCH signal expressed with the orthogonal code is transmitted, the BS can obtain an index of the orthogonal code by using a correlation value of the orthogonal code. According to the index of the orthogonal code, the BS can know to which ACKCH a received signal (i.e., an ACK signal or a NACK signal) belongs among the plurality of ACKCHs.

Figure 9:
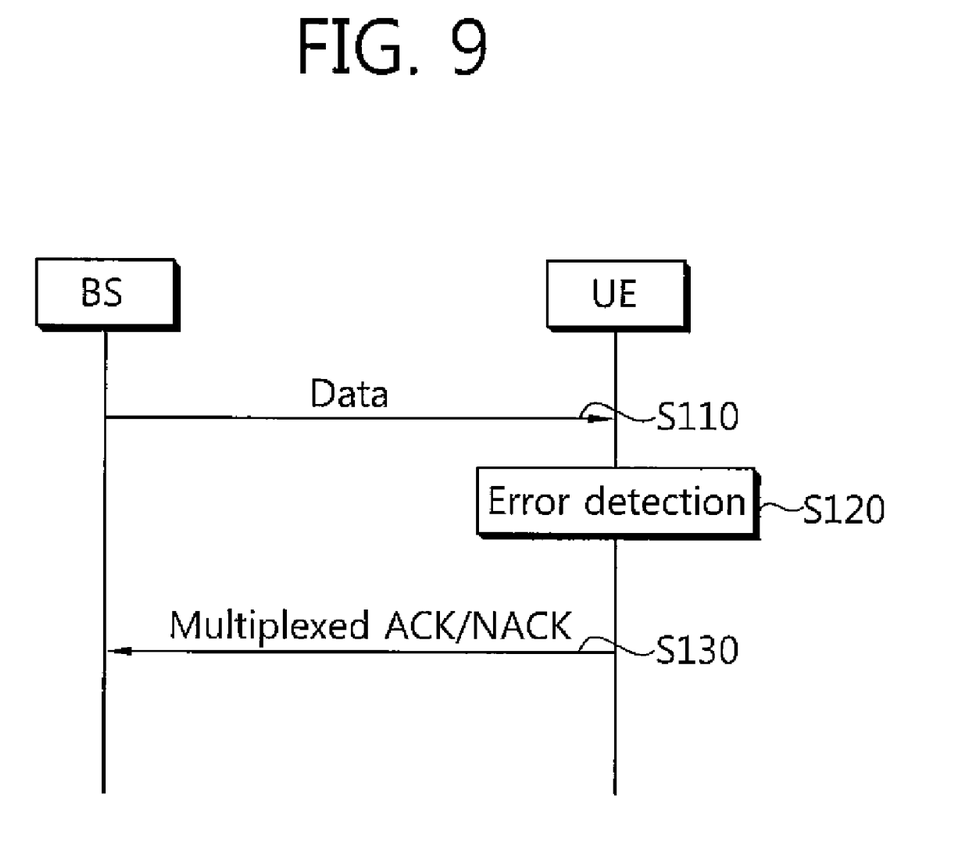
FIG. 9 is a flow diagram showing a data transmission method using hybrid automatic repeat request (HARQ) according to an embodiment of the present invention.

FIG. 9 is a flow diagram showing a data transmission method using hybrid automatic repeat request (HARQ) according to an embodiment of the present invention.

Referring to FIG. 9, a BS transmits downlink data (step S110). A UE receives the downlink data, and decodes the received downlink data to detect an error (step S120). As a response signal for the downlink data, the UE transmits an ACK/NACK signal (step S130). If no error is detected from the downlink data, the UE transmits an ACK signal. If the error is detected from the downlink data, the UE transmits a NACK signal.

While or before downlink data is transmitted, the BS allocates radio resources on which the UE transmits the ACK/NACK signal through a downlink control channel. In this case, the BS can assign one ACKCH region to a plurality of UEs. That is, the ACK/NACK signal transmitted from the plurality of UEs is multiplexed and transmitted in one ACKCH region. Alternatively, the BS can assign to one UE a plurality of ACKCHs assigned to one ACKCH region. The GE can transmit a plurality of ACK/NACK signals through each ACKCH. The plurality of ACK/NACK signals transmitted from a plurality of UEs or one UE can be multiplexed using the aforementioned pilot separation method, orthogonal pilot allocation method, orthogonal code vector set, etc. An ACK/NACK signal transmission method used by the UE may be a predetermined method or may be determined by the BS. The BS can identify the multiplexed ACK/NACK signal by using a correlation value of an orthogonal code or a pilot.

Although downlink HARQ has been described above, the technical features of the present invention can equally apply to uplink HARQ. In addition, the present invention is not limited to the aforementioned tile structure, and thus the position and number of pilot subcarriers and data subcarriers included in a tile can be changed variously.

Since a multiplexed acknowledgment (ACK)/non-acknowledgement (NACK) signal can be transmitted by assigning a plurality of ACK channels in one ACK channel region, limited radio resources can be effectively used.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

What is claimed is:

1. A method of transmitting an acknowledgment (ACK)/non-acknowledgement (NACK) signal in a wireless communication system, the method comprising:
    assigning at least one ACK channel amongst a plurality of ACK channels which share an ACK channel region for transmitting the ACK/NACK signal; and
    transmitting the ACK/NACK signal through the at least one ACK channel,
    wherein the at least one ACK channel comprises at least one tile,
    wherein the at least one tile is arranged with a plurality of symbols in a time domain and a plurality of subcarriers in a frequency domain, and comprises a continuous sequence of data subcarriers that does not include pilot subcarriers,
    wherein the ACK/NACK signal of the at least one ACK channel is assigned an orthogonal vector set that is associated with the at least one tile, and
    wherein the orthogonal vector set is generated with an orthogonal code having a length proportional to a number of data subcarriers in the continuous sequence of data subcarriers.

2. The method of claim 1, wherein the number of data subcarriers in the continuous sequence of data subcarriers is equal to a numeric value derived by multiplying a number of the plurality of symbols in the time domain with a number of the plurality of subcarriers in the frequency domain.

3. The method of claim 1, wherein the orthogonal code is a Walsh code.

4. An apparatus having a radio unit for transmitting an acknowledgment (ACK)/non-acknowledgement (NACK) signal in a wireless communication system, configured to:
    assign at least one ACK channel amongst a plurality of ACK channels which share an ACK channel region for transmitting the ACK/NACK signal; and
    transmit the ACK/NACK signal through the at least one ACK channel,
    wherein the at least one ACK channel comprises at least one tile,
    wherein the at least one tile is arranged with a plurality of symbols in a time domain and a plurality of subcarriers in a frequency domain, and comprises a continuous sequence of data subcarriers that does not include pilot subcarriers,
    wherein the ACK/NACK signal of the at least one ACK channel is assigned an orthogonal vector set that is associated with the at least one tile, and
    wherein the orthogonal vector set is generated with an orthogonal code having a length proportional to a number of data subcarriers in the continuous sequence of data subcarriers.

5. The apparatus of claim 4, wherein the number of data subcarriers in the continuous sequence of data subcarriers is equal to a numeric value derived by multiplying a number of the plurality of symbols in the time domain with a number of the plurality of subcarriers in the frequency domain.

6. The apparatus of claim 4, wherein the orthogonal code is a Walsh code.

* * * * *